US012018839B2

(12) United States Patent
Naik et al.

(10) Patent No.: US 12,018,839 B2
(45) Date of Patent: Jun. 25, 2024

(54) GAS TURBINE ENGINE COMBUSTOR WITH DILUTION PASSAGES

(71) Applicant: GENERAL ELECTRIC COMPANY, Schenectady, NY (US)

(72) Inventors: Pradeep Naik, Bengaluru (IN); Perumallu Vukanti, Bengaluru (IN); Michael T. Bucaro, Arvada, CO (US); Sibtosh Pal, Mason, OH (US); Michael A. Benjamin, West Chester, OH (US); Bhavya Naidu Panduri, Bengaluru (IN); Aritra Chakraborty, Bengaluru (IN); Pabitra Badhuk, Bengaluru (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/969,913

(22) Filed: Oct. 20, 2022

(65) Prior Publication Data
US 2024/0133553 A1 Apr. 25, 2024

(51) Int. Cl.
*F02C 7/22* (2006.01)
*F23R 3/00* (2006.01)
*F23R 3/28* (2006.01)

(52) U.S. Cl.
CPC ............... *F23R 3/28* (2013.01); *F02C 7/22* (2013.01); *F23R 3/002* (2013.01); *F05D 2220/32* (2013.01); *F05D 2240/35* (2013.01)

(58) Field of Classification Search
CPC .... F23R 3/002; F23R 3/06; F23R 3/16; F23R 3/20; F23R 3/26; F23R 3/28; F23R 3/46; F23R 3/50; F05D 2240/35; F05D 2220/32
See application file for complete search history.

(56) References Cited

U.S. PATENT DOCUMENTS

| 2,545,495 | A | | 3/1951 | Sforzini |
| 3,077,073 | A | | 2/1963 | Kuhrt |
| 4,062,182 | A | | 12/1977 | Fehler et al. |
| 4,085,581 | A | | 4/1978 | Caruel |
| 4,262,486 | A | | 4/1981 | Russell |
| 4,689,961 | A | | 9/1987 | Stratton |
| 4,903,492 | A | | 2/1990 | King |
| 5,288,021 | A | * | 2/1994 | Sood ............... F23C 7/004 60/742 |
| 5,331,805 | A | | 7/1994 | Myers |
| 5,467,926 | A | * | 11/1995 | Idleman ........... F23D 14/78 60/737 |
| 6,148,604 | A | | 11/2000 | Salt et al. |

(Continued)

FOREIGN PATENT DOCUMENTS

| CA | 2939125 A1 | 3/2017 |
| EP | 2206964 A3 | 5/2012 |

(Continued)

*Primary Examiner* — Todd E Manahan
*Assistant Examiner* — Rodolphe Andre Chabreyrie
(74) *Attorney, Agent, or Firm* — McGarry Bair PC

(57) ABSTRACT

A combustor including an annular liner, a dome wall, a combustion chamber, at least one fuel cup and at least one dilution passage. The fuel cup being provided on the dome wall and being fluidly coupled to the combustion chamber. The fuel cup defining a fuel cup centerline. The at least on dilution passage terminating in at least on slot opening onto the dome wall, with the at least one slot having a longitudinal body axis.

20 Claims, 13 Drawing Sheets

(56) References Cited

U.S. PATENT DOCUMENTS

| | | |
|---|---|---|
| 7,389,643 B2 | 6/2008 | Simons et al. |
| 7,546,737 B2 | 6/2009 | Schumacher et al. |
| 7,681,398 B2 | 3/2010 | Patel et al. |
| 8,109,099 B2 | 2/2012 | Tu et al. |
| 8,365,536 B2 | 2/2013 | Khan et al. |
| 8,424,311 B2 | 4/2013 | York et al. |
| 8,590,312 B2 | 11/2013 | Sandelis |
| 8,607,572 B2 | 12/2013 | Koizumi et al. |
| 9,103,547 B2 | 8/2015 | Eroglu et al. |
| 9,534,790 B2 | 1/2017 | Cai et al. |
| 9,557,060 B2 | 1/2017 | Papple et al. |
| 9,840,924 B2 | 12/2017 | Hase et al. |
| 10,072,846 B2 | 9/2018 | Monahan et al. |
| 10,088,159 B2 | 10/2018 | Erbas-Sen et al. |
| 10,132,500 B2 | 11/2018 | Ryon et al. |
| 10,208,958 B2 | 2/2019 | Carroni et al. |
| 10,408,457 B2 | 9/2019 | Akiyama et al. |
| 10,648,666 B2 | 5/2020 | Bouldin et al. |
| 10,731,861 B2 | 8/2020 | Schlein |
| 10,844,791 B2 | 11/2020 | Olsen et al. |
| 11,029,027 B2 | 6/2021 | Lewis et al. |
| 2009/0188256 A1 | 7/2009 | Woodcock et al. |
| 2010/0293959 A1* | 11/2010 | Remy ............... F23R 3/36 60/776 |
| 2011/0056205 A1 | 3/2011 | Carroni et al. |
| 2019/0162414 A1 | 5/2019 | Ogata et al. |
| 2021/0247069 A1 | 8/2021 | Iwai et al. |

FOREIGN PATENT DOCUMENTS

| | | |
|---|---|---|
| EP | 2685170 A1 | 1/2014 |
| EP | 2902708 B1 | 2/2017 |
| EP | 2407720 B1 | 10/2019 |
| EP | 2959229 B1 | 10/2020 |
| EP | 4209714 A1 | 7/2023 |
| GB | 2429516 B | 12/2010 |
| GB | 2581385 B1 | 8/2020 |
| JP | S5328306 U | 3/1978 |

* cited by examiner

GAS TURBINE ENGINE COMBUSTOR WITH DILUTION PASSAGES

TECHNICAL FIELD

The present subject matter relates generally to a gas turbine engine combustor with dilution passages, more specifically to a combustor having a set of dilution passages located in a dome wall.

BACKGROUND

Gas turbine engines are driven by a flow of combustion gases passing through the engine to rotate a multitude of turbine blades. A combustor can be provided within the gas turbine engine and is fluidly coupled with a turbine into which the combusted gases flow.

The use of hydrocarbon fuels in the combustor of a gas turbine engine is known. Generally, air and fuel are fed to a combustion chamber, the air and fuel are mixed, and then the fuel mixture is combusted to produce hot gas. The hot gas is then fed to a turbine where it rotates the turbine, cools and expands to produce power. By-products of the hydrocarbon fuel combustion typically include nitrogen oxide and nitrogen dioxide (collectively called NO.), carbon monoxide (CO), unburned hydrocarbon (UHC) (e.g., methane and volatile organic compounds that contribute to the formation of atmospheric ozone), and other oxides, including oxides of sulfur (e.g., $SO_2$ and $SO_3$).

DETAILED DESCRIPTION

Figure 1:
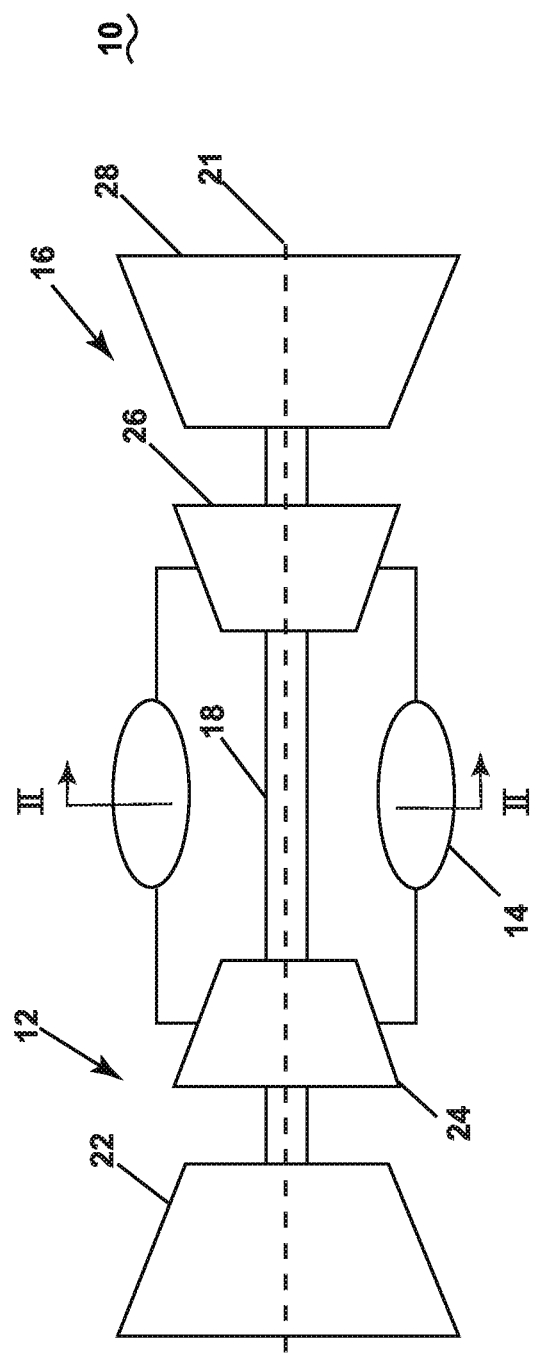
FIG. 1 is a schematic of a gas turbine engine.

Aspects of the disclosure described herein are directed to a combustor. The combustor includes a combustion chamber at least partially defined by a dome wall. At least one fuel cup is provided on the dome wall and fluidly coupled to the combustion chamber. At least one dilution passage extends through the dome wall and terminates in at least one slot opening onto the dome wall. As used herein, the term "slot" refers to an elongated opening including a first body dimension and a second body dimension, transverse the first body dimension, with the first body dimension being greater than the second body dimension. As a non-limiting example, the term "slot" can further be defined as a non-circular opening.

For purposes of illustration, the present disclosure will be described with respect to a gas turbine engine. It will be understood, however, that aspects of the disclosure described herein are not so limited and that a combustor as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a gas turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 is a schematic view of a gas turbine engine 10. As a non-limiting example, the gas turbine engine 10 can be used within an aircraft. The gas turbine engine 10 can include, at least, a compressor section 12, a combustion section 14, and a turbine section 16 in serial flow arrangement. A drive shaft 18 rotationally couples the compressor and turbine sections 12, 16, such that rotation of one affects the rotation of the other, and defines a rotational axis or engine centerline 21 for the gas turbine engine 10.

The compressor section 12 can include a low-pressure (LP) compressor 22, and a high-pressure (HP) compressor 24 serially fluidly coupled to one another. The turbine section 16 can include an LP turbine 26, and an HP turbine 28 serially fluidly coupled to one another. The drive shaft 18 can operatively couple the LP compressor 22, the HP compressor 24, the LP turbine 26 and the HP turbine 28 together. Alternatively, the drive shaft 18 can include an LP drive shaft (not illustrated) and an HP drive shaft (not illustrated). The LP drive shaft can couple the LP compressor 22 to the LP turbine 26, and the HP drive shaft can couple the HP compressor 24 to the HP turbine 28. An LP spool can be defined as the combination of the LP compressor 22, the LP turbine 26, and the LP drive shaft such that the rotation of the LP turbine 26 can apply a driving force to the LP drive shaft, which in turn can rotate the LP compressor 22. An HP spool can be defined as the combination of the HP compressor 24, the HP turbine 28, and the HP drive shaft such that the rotation of the HP turbine 28 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the gas turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 28 at a downstream end of the combustion section 14.

During operation of the gas turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 28, which drives the HP compressor 24. The combustion gases are discharged into the LP turbine 26, which extracts additional work to drive the LP compressor 22, and the exhaust gas is ultimately discharged from the gas turbine engine 10 via an exhaust section (not illustrated) downstream of the turbine section 16. The driving of the LP turbine 26 drives the LP spool to rotate the fan (not illustrated) and the LP compressor 22. The pressurized airflow and the combustion gases can together define a working airflow that flows through the fan, compressor section 12, combustion section 14, and turbine section 16 of the gas turbine engine 10.

Figure 2:
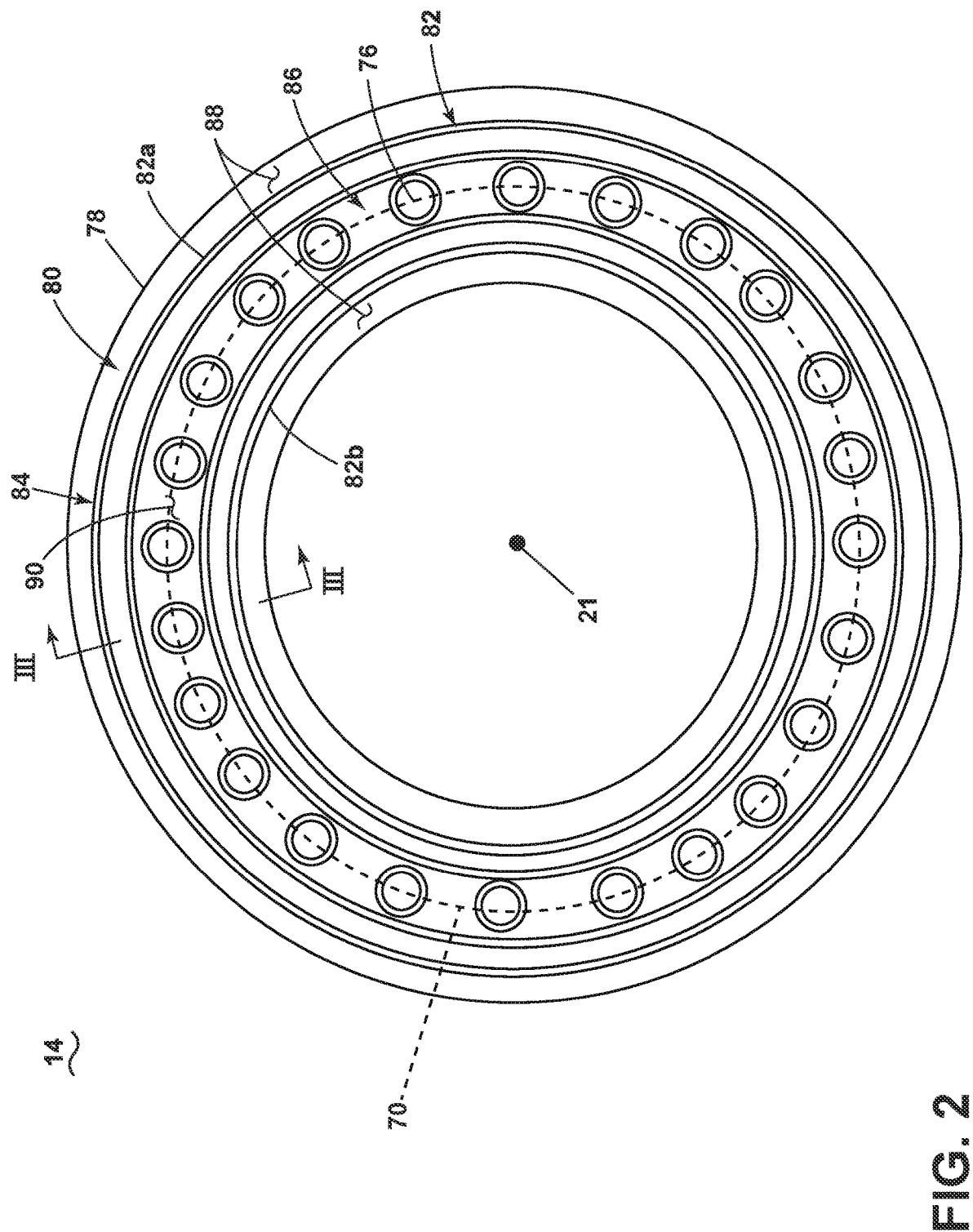
FIG. 2 depicts a cross-section view along line II-II of FIG. 1 of a combustion section of the gas turbine engine.

FIG. 2 depicts a cross-section view of the combustion section 14 along line II-II of FIG. 1. The combustion section 14 can include an annular arrangement of fuel cups 76 disposed around the engine centerline 21 of the gas turbine engine 10. Each of the fuel cups 76 can be connected to a combustor 80. It should be appreciated that the annular arrangement of fuel cups can be one or multiple fuels cups and one or more of the fuel cups 76 can have different characteristics.

The combustor 80 can have a can, can-annular, or annular arrangement depending on the type of engine in which the combustor 80 is located. In a non-limiting example, an annular arrangement is illustrated and disposed within a casing 78. The combustor 80 is defined by a combustor liner 82 including an outer annular combustor liner 82a and an inner annular combustor liner 82b concentric with respect to each other and annular about the engine centerline 21. A dome assembly 84 including a dome wall 90 together with the combustor liner 82 can define a combustion chamber 86 annular about the engine centerline 21. At least one fuel cup 76, illustrated as multiple fuel injectors annularly arranged about the engine centerline 21, is fluidly coupled to the combustion chamber 86. As illustrated, the at least one fuel cup 76 can be included within a plurality of fuel cups that are circumferentially arranged along a circumferential line 70 that passes through the center of each fuel cup 76. Alternatively, one or more fuel cups 76 can be offset from the circumferential line 70. A compressed air passageway 88 can be defined at least in part by both the combustor liner 82 and the casing 78.

Figure 3:
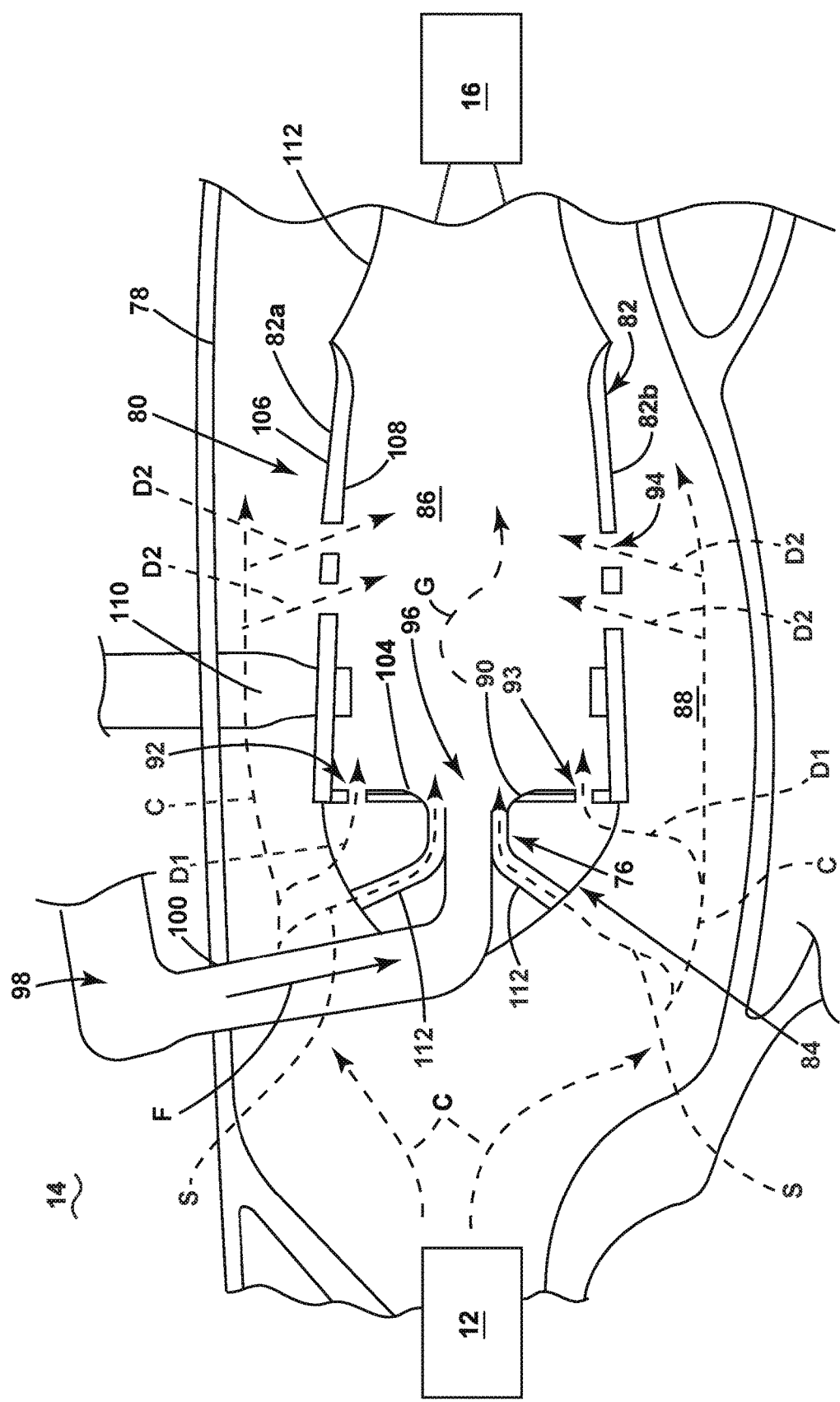
FIG. 3 is a schematic of a side cross-sectional view taken along line III-III of FIG. 2 of a combustor in the combustion section formed from a combustor liner having multiple sets of dilution passages according to an aspect of the disclosure herein.

FIG. 3 depicts a cross-section view taken along line III-III of FIG. 1 illustrating the combustion section 14. A first set of dilution passages 92, a second set of dilution passages 93 and a third set of dilution passages 94 can fluidly connect the compressed air passageway 88 and the combustor 80.

The fuel cup 76 can be coupled to and disposed within the dome assembly 84. The fuel cup 76 can include a flare cone 104 and a swirler 112. The flare cone 104 includes an outlet 96 of the fuel cup 76 directly fluidly coupled to the combustion chamber 86. The fuel cup 76 is fluidly coupled to a fuel inlet 98 via a linear passageway 100.

Both the inner and outer combustor liners 82a, 82b can have an outer surface 106 and an inner surface 108 at least partially defining the combustion chamber 86. The combustor liner 82 can be made of one continuous monolithic portion or be multiple monolithic portions assembled together to define the inner and outer combustor liners 82a, 82b. By way of non-limiting example, the outer surface 106 can define a first piece of the combustor liner 82 while the inner surface 108 can define a second piece of the combustor liner 82 that when assembled together form the combustor liner 82. As described herein, the combustor liner 82 includes the third set of dilution passages 94. It is further contemplated that the combustor liner 82 can be any type of combustor liner 82, including but not limited to a single wall or a double walled liner or a tile liner. An ignitor 110 can be provided at the combustor liner 82 and fluidly coupled to the combustion chamber 86, at any location, by way of non-limiting example upstream of the third set of dilution passages 94.

During operation, a compressed air (C) can flow from the compressor section 12 to the combustor 80 through the dome assembly 84. The compressed air (C) is fed to the fuel cup 76 via the swirler 112 as a swirled airflow (S). A flow of fuel (F) is fed to the fuel cup 76 via the fuel inlet 98 and the linear passageway 100. The swirled airflow (S) and the flow of fuel (F) are mixed at the flare cone 104 and fed to the combustion chamber 86 as a fuel/air mixture. The ignitor 110 can ignite the fuel/air mixture to define a flame within the combustion chamber 86, which generates a combustion gas (G). While shown as starting axially downstream of the outlet 96, it will be appreciated that the fuel/air mixture can be ignited at or near the outlet 96.

The compressed air (C) is further fed to dilution passages 92, 93 as a first dilution airflow (D1) and to the third set of dilution passages 94 as a second dilution airflow (D2). The first dilution airflow (D1) is used to direct and shape the flame, while the second dilution airflow (D2) is used to direct the combustion gas (G).

The combustor 80 shown in FIG. 3 is well suited for the use of a hydrogen-containing gas as the fuel because it helps contain the faster moving flame front associated with hydrogen fuel, as compared to traditional hydrocarbon fuels. However, the combustor 80 can be used with traditional hydrocarbon fuels.

Figure 4:
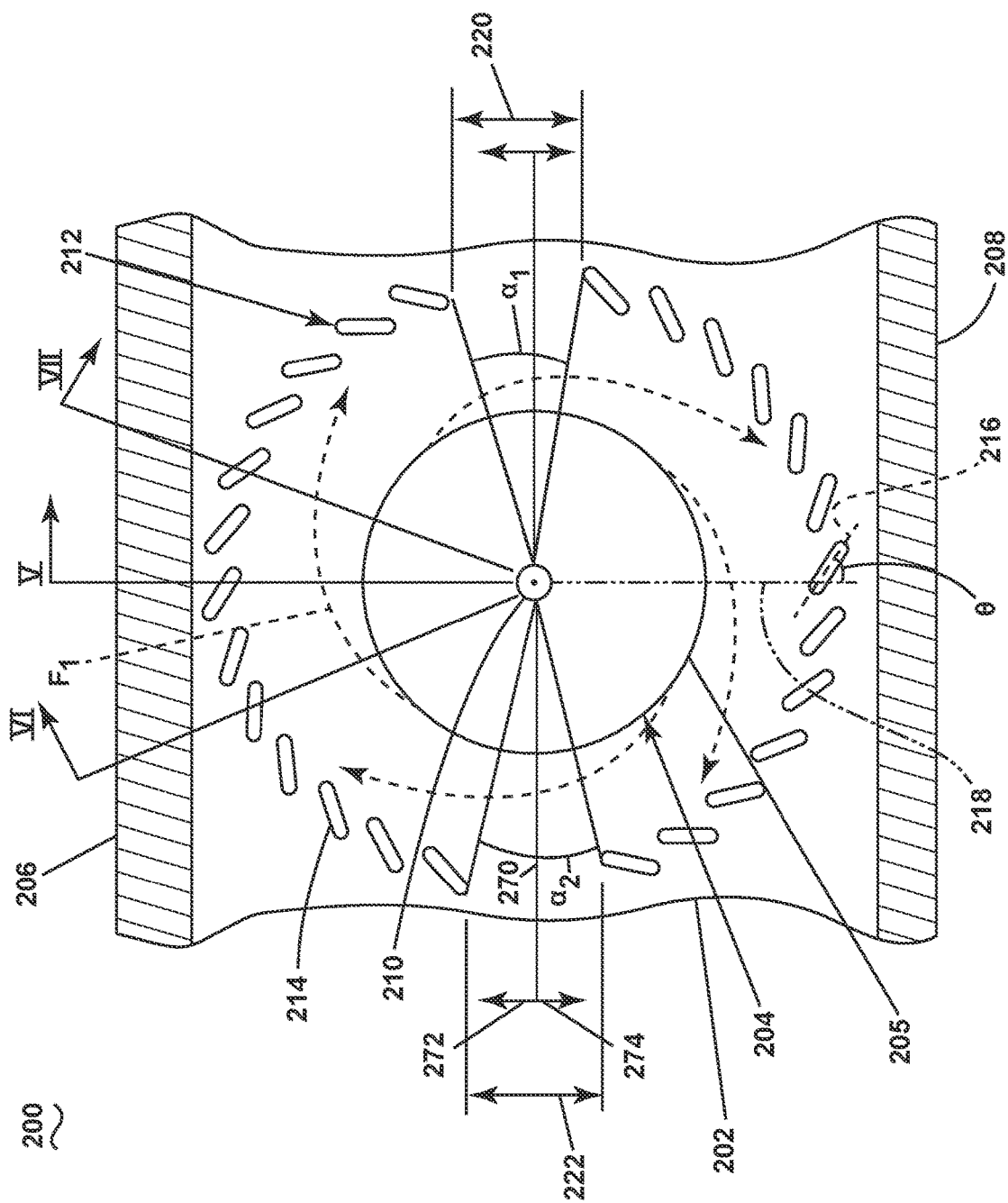
FIG. 4 is a schematic, transverse cross-sectional view of a dilution passage arrangement provided on a dome wall suitable for use within the combustor of FIG. 3.

FIG. 4 is a schematic, transverse, cross-sectional view of a dilution passage arrangement 200 on a dome wall 202 suitable for use within the combustor 80 of FIG. 3. Therefore, similar parts of the dilution passage arrangement 200 and the combustor 80 will be given similar names, with it being understood that the description of similar parts of the combustor 80 applies to the dilution passage arrangement 200, unless indicated otherwise. The dilution passage arrangement 200 is provided on the dome wall 202 around a fuel cup 204 having a fuel cup centerline 210 and an outlet 205. The dome wall 202 extends between an outer liner 206 and an inner liner 208.

A plurality of dilution passages 212 extend through the dome wall 202 and terminate in a plurality of slots 214. The plurality of slots 214 are circumrenal spaced about at least a portion of the fuel cup centerline 210. As a non-limiting example, a single dilution passage 212 terminates in a single slot 214. However, a dilution passage can have multiple branches, with each branch terminating in a slot. Each slot of the plurality of slots 214 is defined by a cross-sectional area when viewed along a vertical plane extending perpendicularly to the fuel cup centerline 210 and intersecting the slot 214. The cross-sectional area can be any suitable shape such as, but not limited to, obround, ovate, oblong, elongated, rectangular, triangular, or the like. The slot will be an opening with a first dimension greater than a transverse second dimension. Further, the cross-sectional area can be uniform or non-uniform amongst the plurality of slots 214 such that one or more of the slots can be larger or include a different shape than another slot.

Each slot of the plurality of slots 214 includes a longitudinal body axis 216. The longitudinal body axis 216 extends at a slot angle ($\theta$) formed between the longitudinal body axis 216 and a radial line 218 extending from the fuel cup centerline 210. The slot angle ($\theta$) can be any suitable angle. As a non-limiting example, an absolute value of the slot angle ($\theta$) can be greater than or equal to 0 degrees and less than or equal to 90 degrees (0°≤|θ|≤90°). As a non-limiting example, the slot angle (θ) can be greater than or equal to −90 degrees and less than or equal to 90 degrees (−90°≤θ≤90°). The absolute value of and the magnitude of each slot angle (θ) can be equal to or non-equal to each other. Each slot 214 of the set of slots 214 can include a respective slot angle (θ) that are collectively referred to as a set of slot angles (θ). Each slot angle (θ) of the set of slot angles (θ) can be equal to or non-equal to another slot angle (θ) of the set of slot angles (θ).

The plurality of slots 214 can extend non-continuously about a circumferential extent of the fuel cup 204, with respect to the fuel cup centerline 210, such that a first break 220 and a second break 222 are formed along the dome wall 202. The first break 220 and the second break 222 are each defined by an absence of slots of the plurality of slots 214. The first break 220 and the second break 222 can be formed on circumferentially opposite sides of the fuel cup 204 with respect to the fuel cup centerline 210. Alternatively, the first break 220 and the second break 222 can be unevenly circumferentially spaced about the fuel cup centerline 210. While two breaks are illustrated, it will be appreciated that the plurality of slots 214 can include any number of one or more breaks evenly or non-evenly spaced about the fuel cup centerline 210.

The first break 220 and the second break 222 each extend over an arc segment defined by a first break angle ($\alpha_1$) and a second break angle ($\alpha_2$). The first break angle ($\alpha_1$) can be equal to or non-equal to the second break angle ($\alpha_2$). The first break angle ($\alpha_1$) and the second break angle ($\alpha_2$) can be any suitable angle. As a non-limiting example, an absolute value of the first break angle ($\alpha_1$) and an absolute value of the second break angle ($\alpha_2$) can be greater than or equal to 5 degrees and less than or equal to 120 degrees (5°≤|θ_1, θ_2|≤120°).

A circumferential line 270 extending from the fuel cup centerline 210 and intersecting both the first break 220 and the second break 222 can divide the dome wall 202 into a first radial half 272 and a second radial half 274. The slots 214 formed along the first radial half 272 can be a mirror image or a non-mirror image of the slots 214 formed along the second radial half 274.

During operation, a swirled fuel/air mixture (F1) is supplied through the outlet 205 of the fuel cup 204. The swirled fuel/air mixture (F1) includes a circumferential component extending in a first circumferential direction with respect to the fuel cup centerline 210. Each longitudinal body axis 216 extends outwardly from the fuel cup centerline 210 in a second circumferential direction. The first circumferential direction is parallel to or non-parallel to the second circumferential direction.

Figure 5:
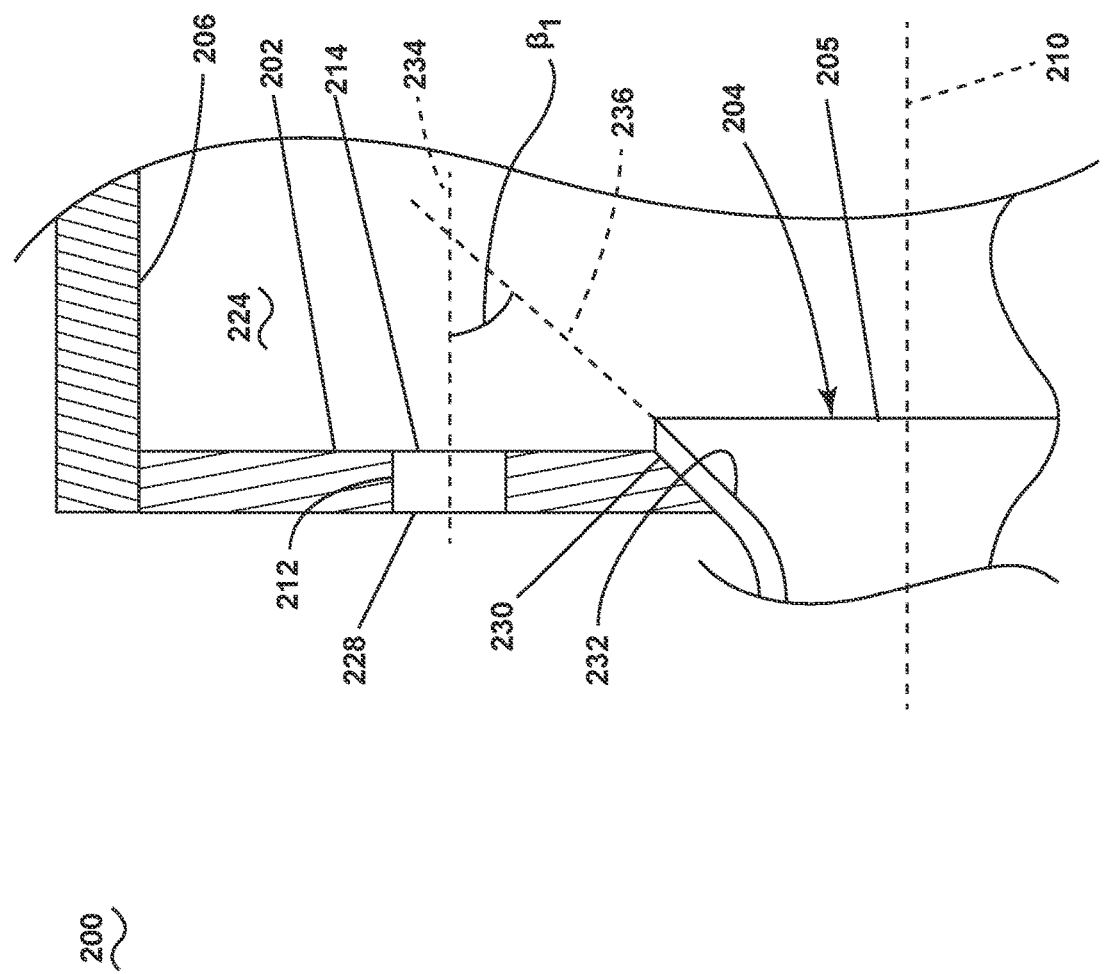
FIG. 5 is a partial side cross-sectional view of the dilution passage arrangement of FIG. 4 as seen from line V of FIG. 4, further illustrating a dilution passage terminating in an axially-facing slot.
Figure 6:
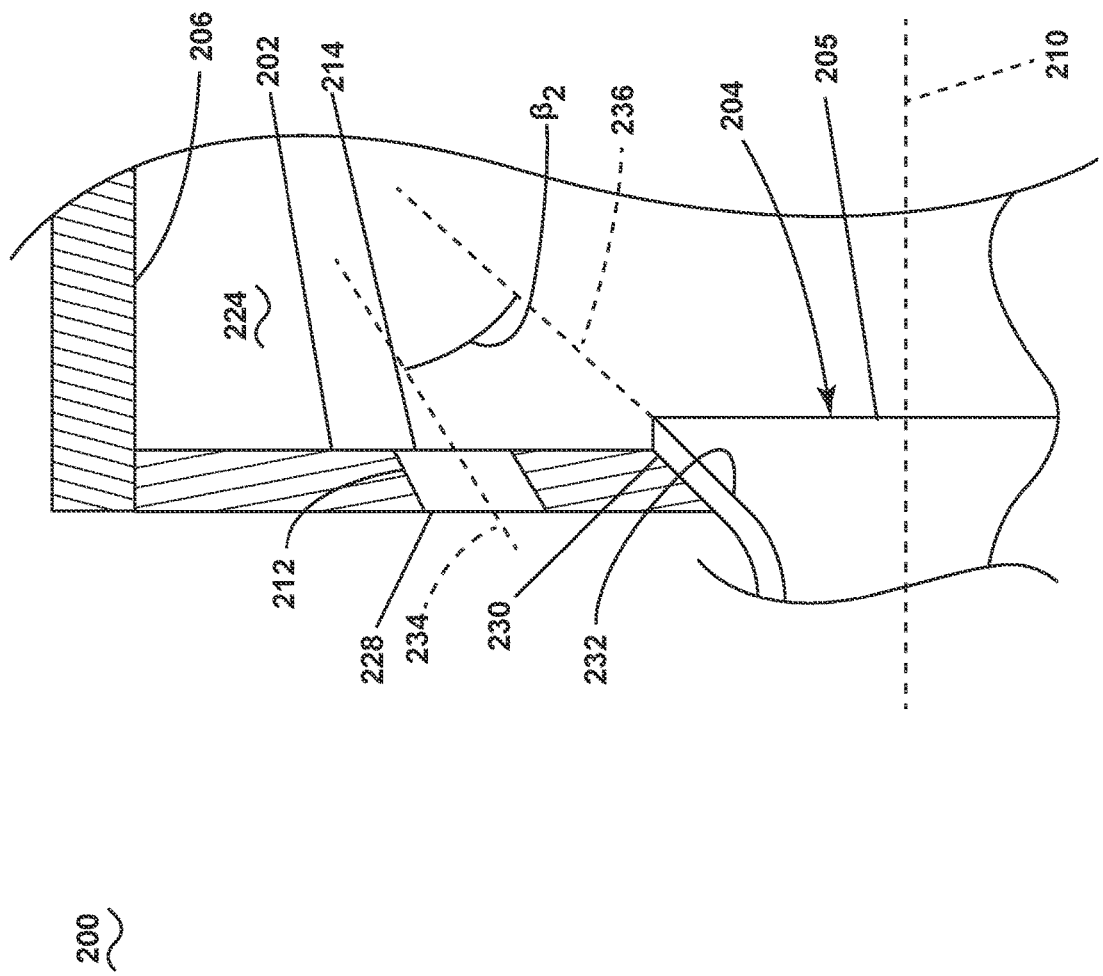
FIG. 6 is a partial side cross-sectional view of the dilution passage arrangement as seen from line VI of FIG. 4, further illustrating a dilution passage terminating in an outwardly-facing slot.
Figure 7:
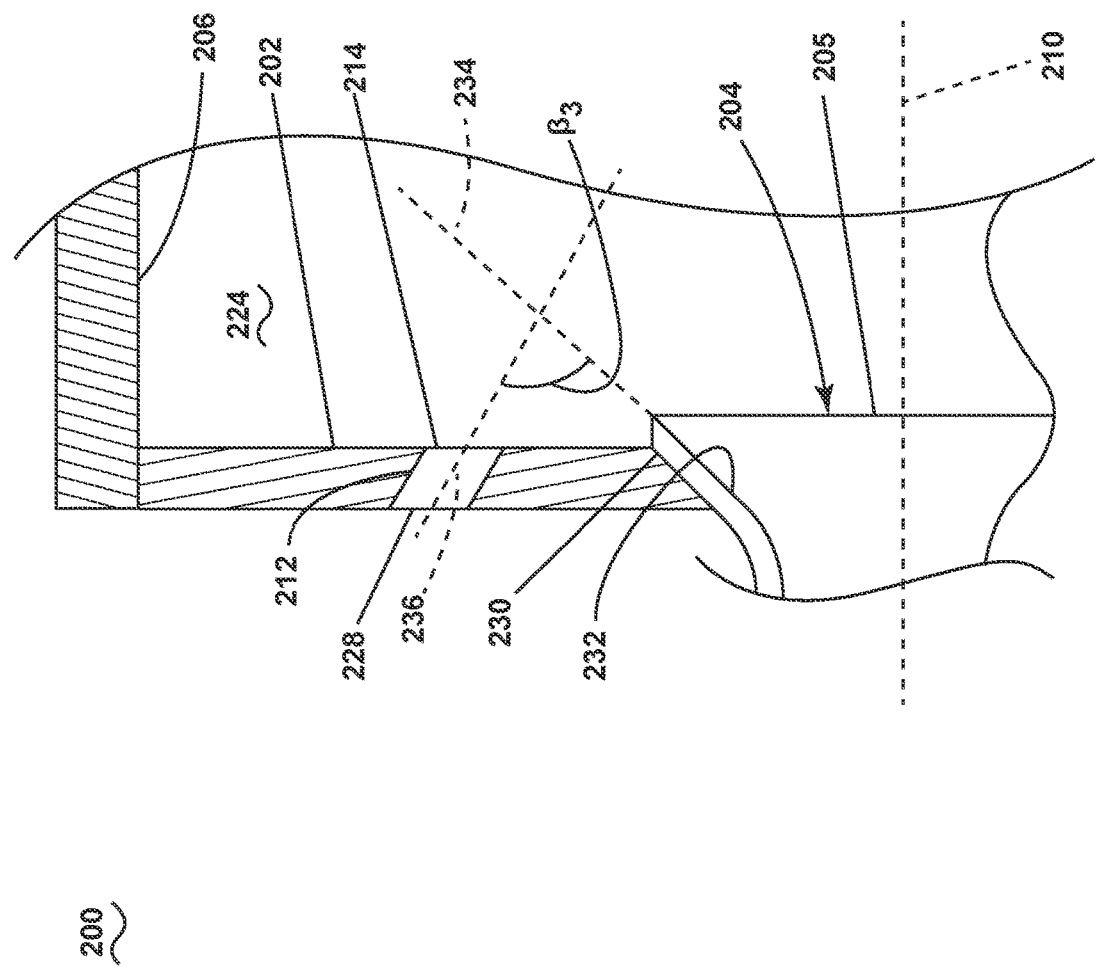
FIG. 7 is a partial side cross-sectional view of the dilution passage arrangement of FIG. 4 as seen from line VII of FIG. 4, further illustrating a dilution passage terminating in an inwardly-facing slot.

FIGS. 5-7 illustrate various non-limiting configurations of the plurality of dilution passages 212 extending through the dome wall 202. Each dilution passage 212 extends between an inlet 228 and a respective slot 214 and includes a dilution passage centerline 234 that extends linearly or non-linearly. The fuel cup 204 includes a flare cone 230 with a flared surface 232 opening up to the outlet 205. The flared surface 232 of the flare cone 230 extends along a flare line 236 with respect to the fuel cup centerline 210. The dome wall 202, the outer liner 206 and the inner liner 208 (FIG. 4) at least partially define a combustion chamber 224. The outlet 205 of the fuel cup 204 and the slot 214 of the dilution passage 212 are each directly fluidly coupled to respective portions of the combustion chamber 224.

FIG. 5 illustrates a partial cross-sectional side view of a dilution passage 212 of the plurality of dilution passages 212 seen from line V of FIG. 4. The dilution passage centerline 234 of the illustrated dilution passage 212 extends parallel to the fuel cup centerline 210 forming an axial dilution passage. The dilution passage centerline 234 forms a first passage angle ($\beta_1$) with the flare line 236.

FIG. 6 illustrates a partial cross-sectional side view of a dilution passage 212 of the plurality of dilution passages 212 seen from line VI of FIG. 4. The dilution passage centerline 234 of the illustrated dilution passage 212 extends radially outward from the fuel cup centerline 210 forming an outward dilution passage. The dilution passage centerline 234 forms a second passage angle ($\beta_2$) with the flare line 236.

FIG. 7 illustrates a partial cross-sectional side view of a dilution passage 212 of the plurality of dilution passages 212 seen from line VII of FIG. 4. The dilution passage centerline 234 of the illustrated dilution passage 212 extends radially inward towards the fuel cup centerline 210 forming an inward dilution passage. The dilution passage centerline 234 forms a third passage angle ($\beta_3$) with the flare line 236.

The first passage angle (Pi), the second passage angle ($\beta_2$) and the third passage angle ($\beta_3$) are any suitable angle. As a non-limiting example, first passage angle ($\beta_1$), the second passage angle ($\beta_2$) and the third passage angle (33) are each greater than or equal to 0 degrees and less than or equal to 120 degrees.

While illustrated as the plurality of dilution passages 212 including the axial, outward and inward dilution passages 212, it will be appreciated that the plurality of dilution passages 212 can be formed as only parallel dilution passages 212, only outward dilution passages 212, only inward dilution passages 212, or any suitable combination thereof.

Figure 8:
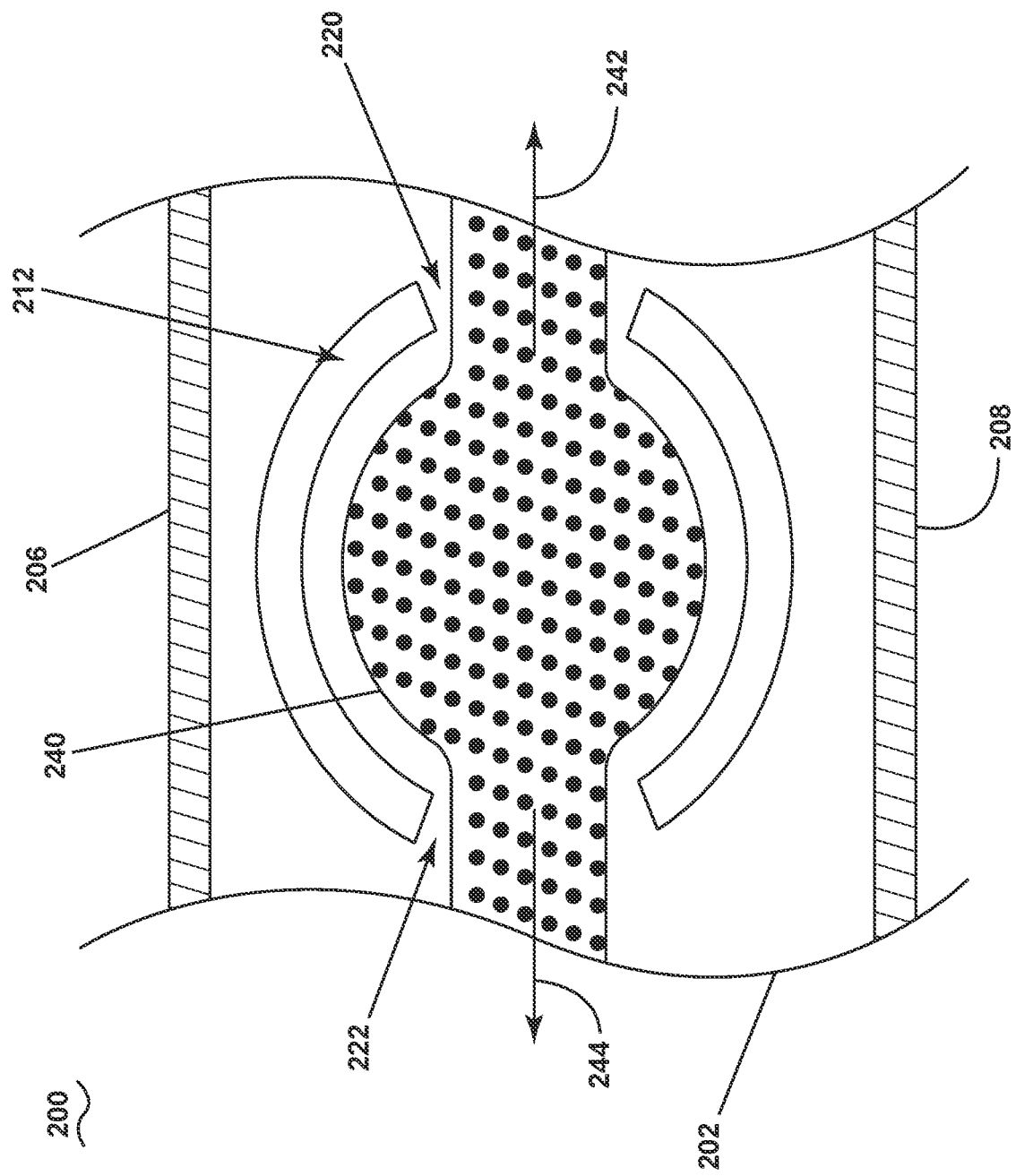
FIG. 8 is a schematic, transverse cross-sectional view of the dilution passage arrangement of FIG. 4, further illustrating a flame shaping attributable to the dilution passages.

FIG. 8 is a schematic, transverse cross-sectional view of the dilution passage arrangement 200 of FIG. 4 having the same view as FIG. 4. During operation, the swirled fuel/air mixture (F1) is ignited to define a flame 240, and a compressed airflow is fed through the plurality of dilution passages 212. The compressed airflow forms a curtain around at least a portion of the circumferential extent of the flame 240. The flame 240, however, is free to flow through the first break 220 and the second break 222 in the directions indicated by arrows 242, 244, respectively.

A plurality of fuel cups 204 (FIG. 4) are circumferentially arranged about the dome wall 202. Each fuel cup 204 can include a respective plurality of dilution passages 212, a first break 220 and a second break 222. It is contemplated that the first break 220 of a first plurality of dilution passages 212 can be at least partially aligned with a second break 222 of a second plurality of dilution passages 212 circumferentially adjacent to the first plurality of dilution passages 212. The flame 240 that spreads through the first break 220 of the first set of dilution passages 212 can meet with and merge with the flame 240 that spreads through the second break 222 of the second set of dilution passages 212. This merging flames 240 ensures that a continuous annular ring of flame is formed along the dome wall 202, which ensures flame propagation from one fuel cup 204 to another and reduces the likelihood of a flameout at any given one of the fuel cups 204.

In the case of a single set of circumferentially arranged fuel cups 204, the fuel cups 204 will generally lie on a circumferential line (e.g., the circumferential line 70 of FIG. 2) that passes through the fuel cup centerline 210 of each fuel cup 204. In such a single set configuration, the first break 220 and the second break 222 will naturally be on the circumferential line. However, in some combustor configurations, fuel cups can comprise multiple sets of circumferentially arranged fuel cups, with each set being at different radial distances, resulting in some fuel cups of one set being radially higher or lower than another set. In such arrangements, the breaks can be at the top (12 o'clock position) or bottom (six o'clock position) of the fuel cup. In other cases, adjacent fuel cups from other sets will be both circumferentially offset as well as radially offset, where the breaks will naturally lie along a line connecting the centerlines of the adjacent offset fuel cups.

The curtain of compressed air from the dilution passages 212 is used for a multitude of reasons. First, the curtain of compressed air prevents the flame 240 from contacting or otherwise overly heating the dome wall 202, the outer liner 206 and the inner liner 208. This, in turn, ensures that that dome wall 202, the outer liner 206, the inner liner 208 or any portions of the combustor (e.g., the combustor 80 of FIG. 3) or gas turbine engine (e.g., the gas turbine engine 10 of FIG. 1) outside of the dome wall 202, the inner liner 208 or the outer liner 206 are not damaged or otherwise overly heated by the flame 240. Second, the curtain of compressed air is used to shape the flame 240. The flame shaping can be done, in part, by the passage angle ($\beta_1$, $\beta_2$, $\beta_3$) and the slot angle ($\theta$). For example, an outward slot (FIG. 6) will allow the flame 240 to expand, thereby generating a flame 240 with a larger surface area, while an inward slot (FIG. 7) will compress or constrict the flame 240, thereby generating a flame 240 with a smaller surface area.

Further, the orientation of the slot angle ($\theta$) (e.g., circumferentially parallel or circumferentially non-parallel to the swirled fuel/air mixture (F1)) can be used to provide a hydrodynamic curtain of compressed air oriented with respect to the swirled fuel/air mixture (F1). It has been found that the orientation of the curtain of compressed air can be used to shape and direct the flame 240. As a non-limiting example, when the curtain of compressed air is non-parallel to the swirled fuel/air mixture (F1), the curtain of compressed air has been found to be better adapted to directing the flame 240 away from the outer liner 206 and the inner liner 208 with respect to the parallel orientation. As a non-limiting example, when the curtain of compressed air is parallel to the swirled fuel/air mixture (F1), the curtain of compressed air has been found to be better adapted to directing the flame 240 away from the dome wall 202 with respect to the non-parallel orientation.

The flow of compressed air flowing through the slots 214 (FIG. 4) can be defined by a total slot flow. The swirled fuel/air mixture (F1) can further be defined by a total fuel cup flow. The total slot flow and the total fuel cup flow are each defined by a volume of fluid (e.g., compressed air or fuel/air mixture, respectively) that flows through the respective slots 214 or fuel cup 204 (FIG. 4) over a period of time (e.g., milliliters/second). The ratio between the total slot flow and the total fuel cup flow can be greater than or equal to 0.5 and less than or equal to 4.

The curtain of compressed air can further be used to ensure that the combustor (e.g., the combustor 80 of FIG. 2) including the dilution passage arrangement 200 can use fuels with high burn temperatures, and burning at fast flame speeds, such as hydrogen-containing fuels. As hydrogen-containing fuels have a significantly higher burn temperature than traditional hydrocarbon fuels, it becomes more important to insulate the flame 240 from the dome wall 202, the outer liner 206 and the inner liner 208 and to cool the dome wall 202, the outer liner 206 and the inner liner 208. The air curtain that is generated through the dilution passage arrangement 200 is used to provide a layer of insulation (e.g., the curtain of compressed air) between the flame 240 and the dome wall 202, the outer liner 206 and the inner liner 208 and to cool the dome wall 202, the outer liner 206 and the inner liner 208 and to direct the flame 240 away from the dome wall 202, the outer liner 206 and the inner liner 208.

Figure 9:
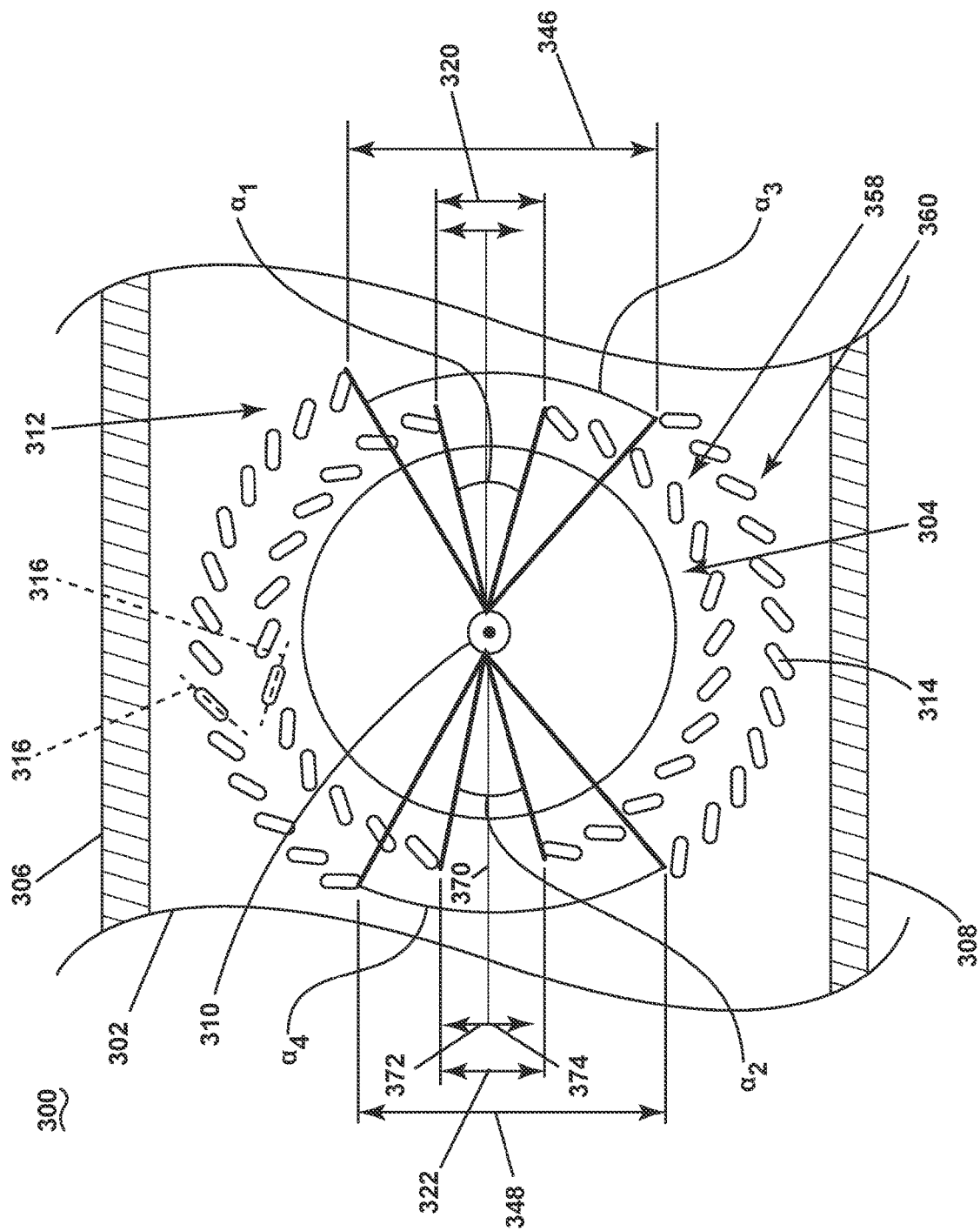
FIG. 9 is a schematic, transverse cross-sectional view of an exemplary dilution passage arrangement suitable for use as the dilution passage arrangement of FIG. 4, further including a fuel cup surrounded by a plurality of slots having a first row, a second row, a first inner break, a second inner break, a first outer break and a second outer break.

FIG. 9 is a schematic, transverse cross-sectional view of an exemplary dilution passage arrangement 300 suitable for use as the dilution passage arrangement 200 of FIG. 4. The dilution passage arrangement 300 is similar to the dilution passage arrangement 200, therefore, like parts will be identified by like numerals increased to the 300 series, with it being understood that the description of the dilution passage arrangement 200 applies to the dilution passage arrangement 300, unless otherwise noted.

The dilution passage arrangement 300 is provided on a dome wall 302 and surrounding a fuel cup 304. The dome wall 302 extends between an outer liner 306 and an inner liner 308. A plurality of dilution passage 312 extend through the dome wall 302 and terminate in a plurality of slots 314 formed along the dome wall 302. Each slot of the plurality slots 314 includes a longitudinal body axis 316. A circumferential line 370 can split the dome wall 302 into a first radial half 372 and a second radial half 374.

The dilution passage arrangement 300 is similar to the dilution passage arrangement 200, except that the dilution passage arrangement 300 includes the plurality of slots 314 having a first row of slots 358 and a second row of slots 360. The first row of slots 314 and the second row of slots 358 each follow a circumferential curvature around at least a portion of the fuel cup centerline 310. The first row of slots 358 is provided radially inwardly from the second row of slots 360, with respect to the fuel cup centerline 310. Both the first row of slots 358 and the second row of slots 360 extend circumferentially about respective portions of the dome wall 302, with respect to the fuel cup centerline 310. The first row of slots 358 can be formed identically or non-identically to the second row of slots 360. As a non-limiting example, the first row of slots 358 and the second row of slots 360 can be oppositely, circumferentially oriented with respect to the fuel cup centerline 310. As such, the longitudinal body axis 316 of each slot of first row of slots 358 can extend from the fuel cup 304 in a first circumferential direction, while the longitudinal body axis 316 of each slot of the second row of slots 360 can extend from the fuel cup 304 in a second circumferential direction, opposite the first circumferential direction.

The first row of slots 358 can include a first total slot flow when the compressed air is fed to the first row of slots 358. The second row of slots 360 can include a second total slot flow when the compressed air is fed to the second row of slots 360. The ratio of the first total slot flow to the total fuel cup flow can be greater than or equal to 0.5 and less than or equal to 4. The ratio of the second total slot flow to the total fuel cup flow can be greater than or equal to 0.4 and less than or equal to 8.

The first row of slots 358 can include a first inner break 320 and a second inner break 322. The second row of slots 360 can include a first outer break 346 and a second outer break 348, each defined by an absence of slots. The first inner break 320 corresponds to a circumferential location where the first outer break 346 is provided. The second inner break 322 corresponds to a circumferential location where the second outer break 348 is provided.

The first inner break 320 and the second inner break 322 each extend over an arc from the fuel cup centerline 310 defined by a first break angle ($\alpha_1$) and a second break angle ($\alpha_2$), respectively. The first outer break 346 and the second outer break 348 each extend over an arc from the fuel cup centerline 310 defined by a third break angle ($\alpha_1$) and a fourth break angle ($\alpha_4$), respectively. The first break angle ($\alpha_1$) and the second break angle ($\alpha_2$) can be greater than or equal to 5 degrees and less than or equal to 90 degrees. The third break angle ($\alpha_3$) and the fourth break angle ($\alpha_4$) can be greater than or equal to 5 degrees and less than or equal to 120 degrees.

The first break angle ($\alpha_1$) can be smaller than the third break angle ($\alpha_3$), and the second break angle ($\alpha_2$) can be smaller than the fourth break angle ($\alpha_4$), such that the first inner break 320 and the second inner break 322 are circumferentially enveloped by the first outer break 346 and the second outer break 348, respectively. Alternatively, at least one of first break angle ($\alpha_1$) or the second break angle ($\alpha_2$) can be larger than or equal to the third break angle ($\alpha_3$) or the fourth break angle ($\alpha_4$), respectively.

The benefit of having two rows of slots 314 is to further shape the flame (e.g., the flame 240 of FIG. 8) such that the flame does not escape through the curtain of compressed air generated by the slots 314 and heat the outer liner 306, inner liner 308 or dome wall 302. The differentiation between the break angles (e.g., the third break angle ($\alpha_3$) being larger than the first break angle ($\alpha_1$)) is used to further control the profile of the flame. As a non-limiting example, with the illustrated configuration where the first break angle ($\alpha_1$) is smaller than the third break angle ($\alpha_3$), the flame that escapes through the first inner break 320 and the first outer break 346 is more radially compressed with respect to a configuration where the first break angle ($\alpha_1$) is larger than the third break angle ($\alpha_3$).

Figure 10:
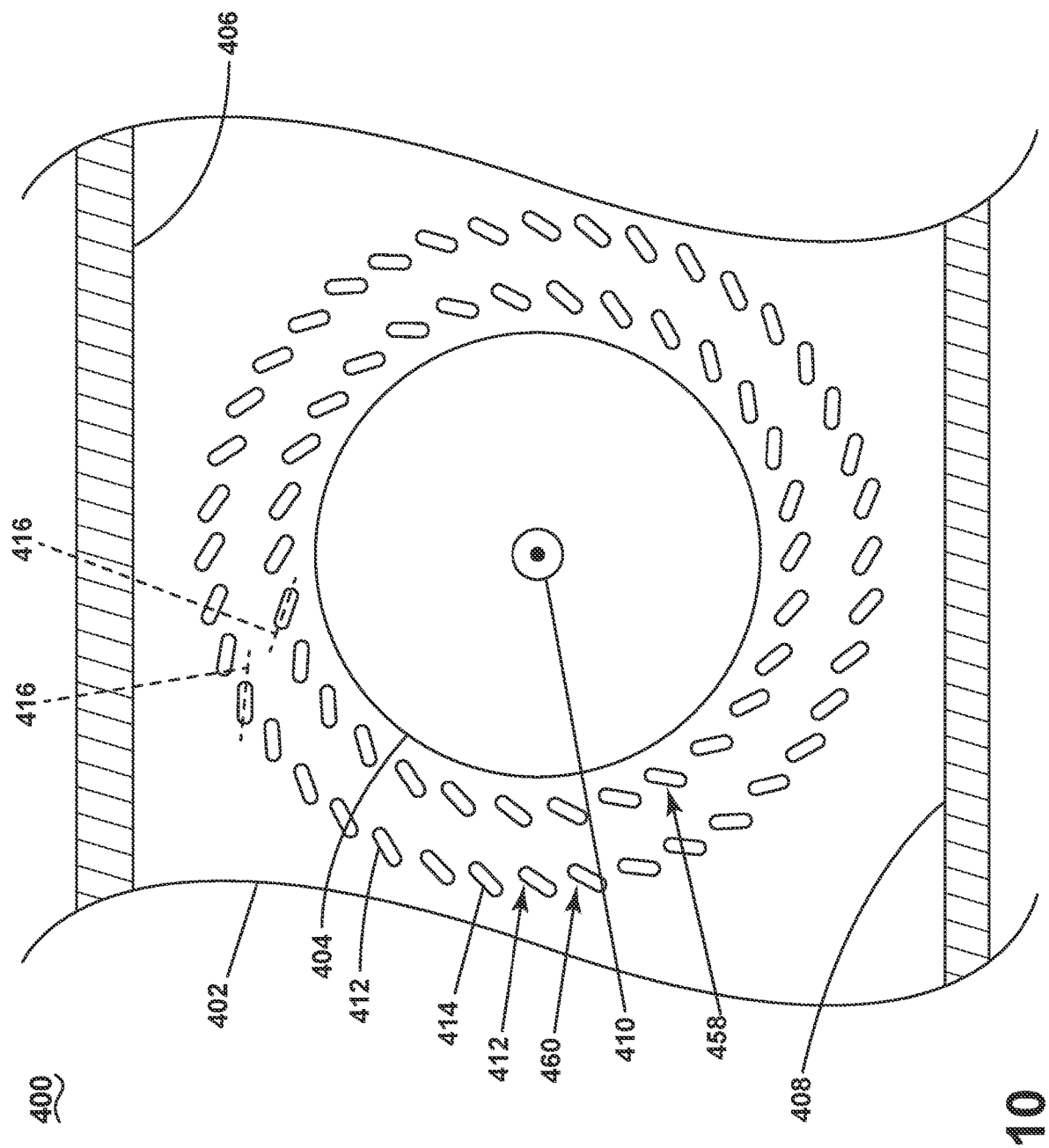
FIG. 10 is a schematic, transverse cross-sectional view of an exemplary dilution passage arrangement suitable for use as the dilution passage arrangement of FIG. 4, further including a fuel cup surrounded by a plurality of slots having a first row and a second row.

FIG. 10 is a schematic, transverse cross-sectional view of an exemplary dilution passage arrangement 400 suitable for use as the dilution passage arrangement 200 of FIG. 4. The dilution passage arrangement 400 is similar to the dilution passage arrangement 200, 300 (FIG. 9), therefore, like parts will be identified by like numerals increased to the 400 series, with it being understood that the description of the dilution passage arrangement 200, 300 applies to the dilution passage arrangement 400, unless otherwise noted.

The dilution passage arrangement 400 is provided on a dome wall 402 and surrounding a fuel cup 404. The dome wall 402 extends between an outer liner 406 and an inner liner 408. A plurality of dilution passage 412 extend through the dome wall 402 and terminate in a plurality of slots 414 formed along the dome wall 402. Each slot of the plurality slots 414 includes a longitudinal body axis 416. The plurality of slots 414 include a first row of slots 458 and a second row of slots 460. The longitudinal body axis 416 of the first and second rows of slots 458, 460 each extend from the fuel cup 404 in the same circumferential direction.

The dilution passage arrangement 400 is similar to the dilution passage arrangement 200, 300, except that the plurality of slots 414 extend continuously about the entirety of the fuel cup centerline 410. In other words, the plurality of slots 414 do not include a break.

Figure 11:
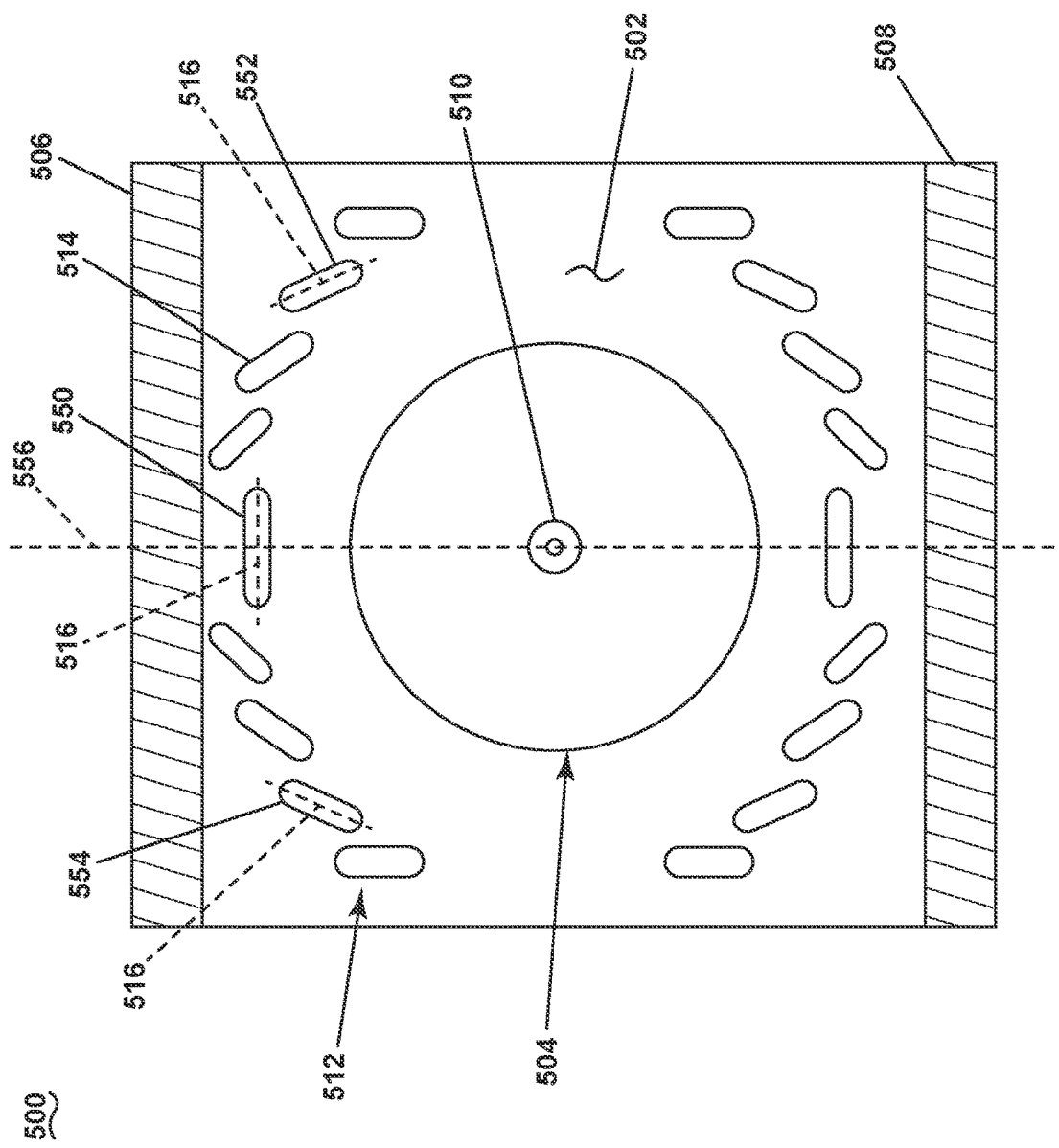
FIG. 11 is a schematic, transverse view of an exemplary dilution passage arrangement suitable for use as the dilution passage arrangement of FIG. 4, further including a fuel cup surrounded by a plurality of planar slots and a plurality of angled slots.

FIG. 11 is a schematic, transverse view of an exemplary dilution passage arrangement 500 suitable for use as the dilution passage arrangement 200 of FIG. 4. The dilution passage arrangement 500 is similar to the dilution passage arrangement 200, 300 (FIG. 9), 400 (FIG. 10), therefore, like parts will be identified by like numerals increased to the 500 series, with it being understood that the description of the dilution passage arrangement 200, 300, 400 applies to the dilution passage arrangement 500, unless otherwise noted.

The dilution passage arrangement 500 is provided on a dome wall 502 extending between an outer liner 506 and an inner liner 508. The dilution passage arrangement 500 surrounds a fuel cup 504 defining a fuel cup centerline 510. A plurality of dilution passages 512 terminate at a plurality of slots 514. The plurality of slots 514 extend across at least a portion of the fuel cup centerline 510.

The dilution passage arrangement 500 is similar to the dilution passage arrangement 200 (FIG. 4), 300 (FIG. 9), 400 (FIG. 10), except that the plurality of slots 514 include at least one planar slot 550, at least one first angled slot 552 and at least one second angled slot 554, each being defined by a respective longitudinal body axis 516. The at least one planar slot 550 extends either perpendicular to or parallel to a radial line extending from the fuel cup centerline 510 and intersecting the longitudinal body axis 516 of the at least one planar slot 550. The first angled slot 552 extends a first circumferential direction from the fuel cup 504, while the second angled slot 554 extends a second circumferential direction, opposite the first circumferential direction, from the fuel cup 504. In other words, the first angled slot 552 and the second angled slot 554 can each include a respective slot angle (e.g., the slot angle ($\theta$) of FIG. 4) that are opposite in magnitude. As a non-limiting example, the first angled slot 552 can be on a circumferentially opposing side of the at least one planar slot 550 from the second angled slot 554, with respect to the fuel cup centerline 510.

The plurality of slots 514 are symmetric about a radial plane 556 extending from the fuel cup centerline 510 and intersecting the inner liner 508 and the outer liner 506 at right angles. Alternatively, the plurality of slots 514 can be non-symmetric about the radial plane 556.

Figure 12:
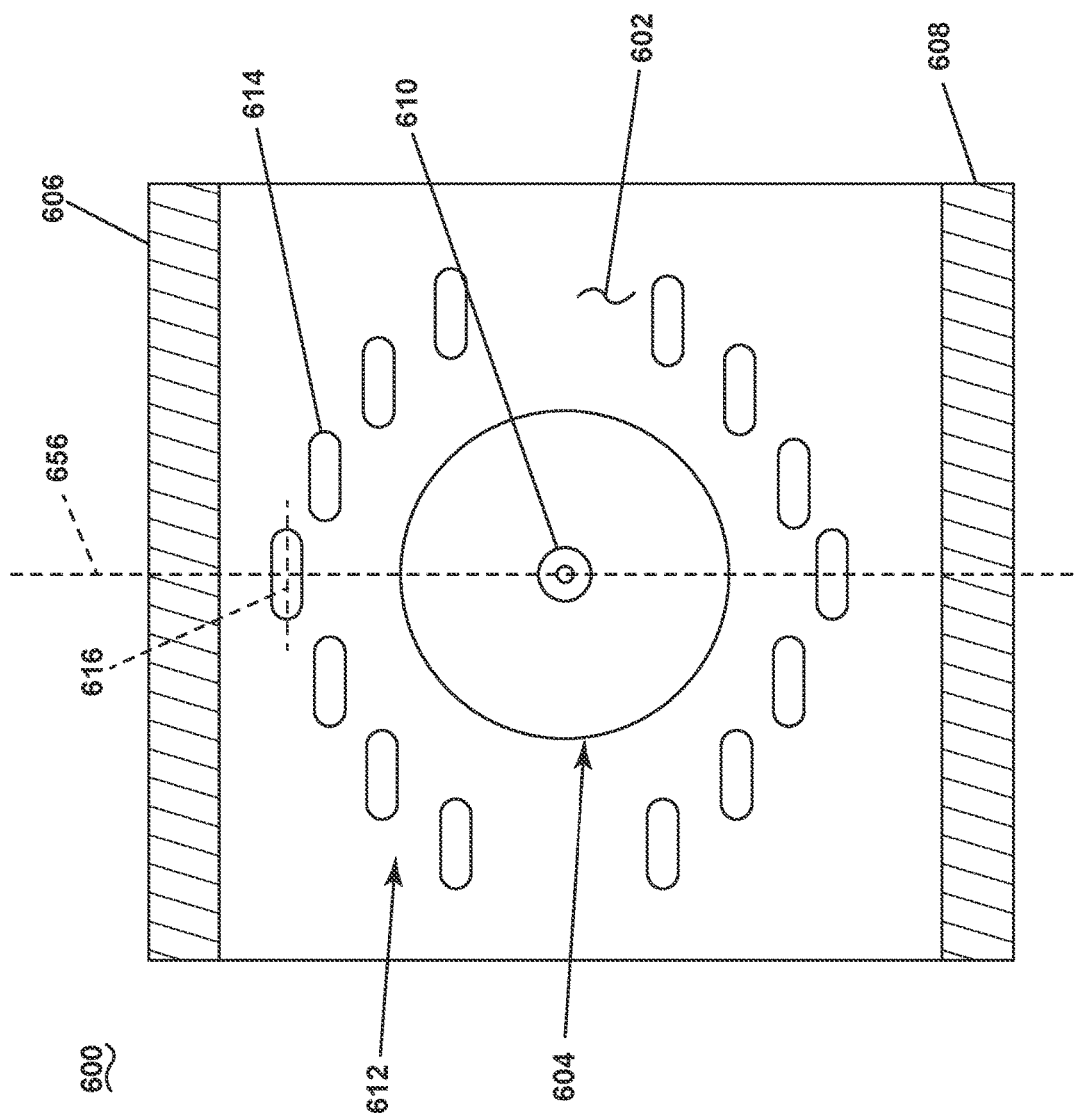
FIG. 12 is a schematic, transverse view of an exemplary dilution passage arrangement suitable for use as the dilution passage arrangement of FIG. 4, further including a fuel cup surrounded by a plurality of planar slots.

FIG. 12 is a schematic, transverse view of an exemplary dilution passage arrangement 600 suitable for use as the dilution passage arrangement 200 of FIG. 4. The dilution passage arrangement 600 is similar to the dilution passage arrangement 200, 300 (FIG. 9), 400 (FIG. 10), 500 (FIG. 11), therefore, like parts will be identified by like numerals increased to the 600 series, with it being understood that the description of the dilution passage arrangement 200, 300, 400, 500 applies to the dilution passage arrangement 600, unless otherwise noted.

The dilution passage arrangement 600 is provided along a dome wall 602 extending between an outer liner 606 and an inner liner 608. The dilution passage arrangement 600 surrounds a fuel cup 604 defining a fuel cup centerline 610. A plurality of dilution passages 612 terminate at a plurality of slots 614. The plurality of slots 614 extend across at least a portion of the fuel cup centerline 610.

The dilution passage arrangement 600, like the dilution passage arrangement 500 (FIG. 11) includes planar slots and is symmetric about a radial plane 656 extending from the fuel cup centerlines 610 and intersecting both the inner liner 608 and the outer liner 606 at right angles. The difference, however, is that all of the slots of the plurality of slots 614 include a longitudinal body axis 616 that is parallel to or perpendicular to a radial line extending from the fuel cup centerline 610 and intersecting the respective slot of the plurality of slots 614. In other words, all of the slots 614 are planar slots 614.

Figure 13:
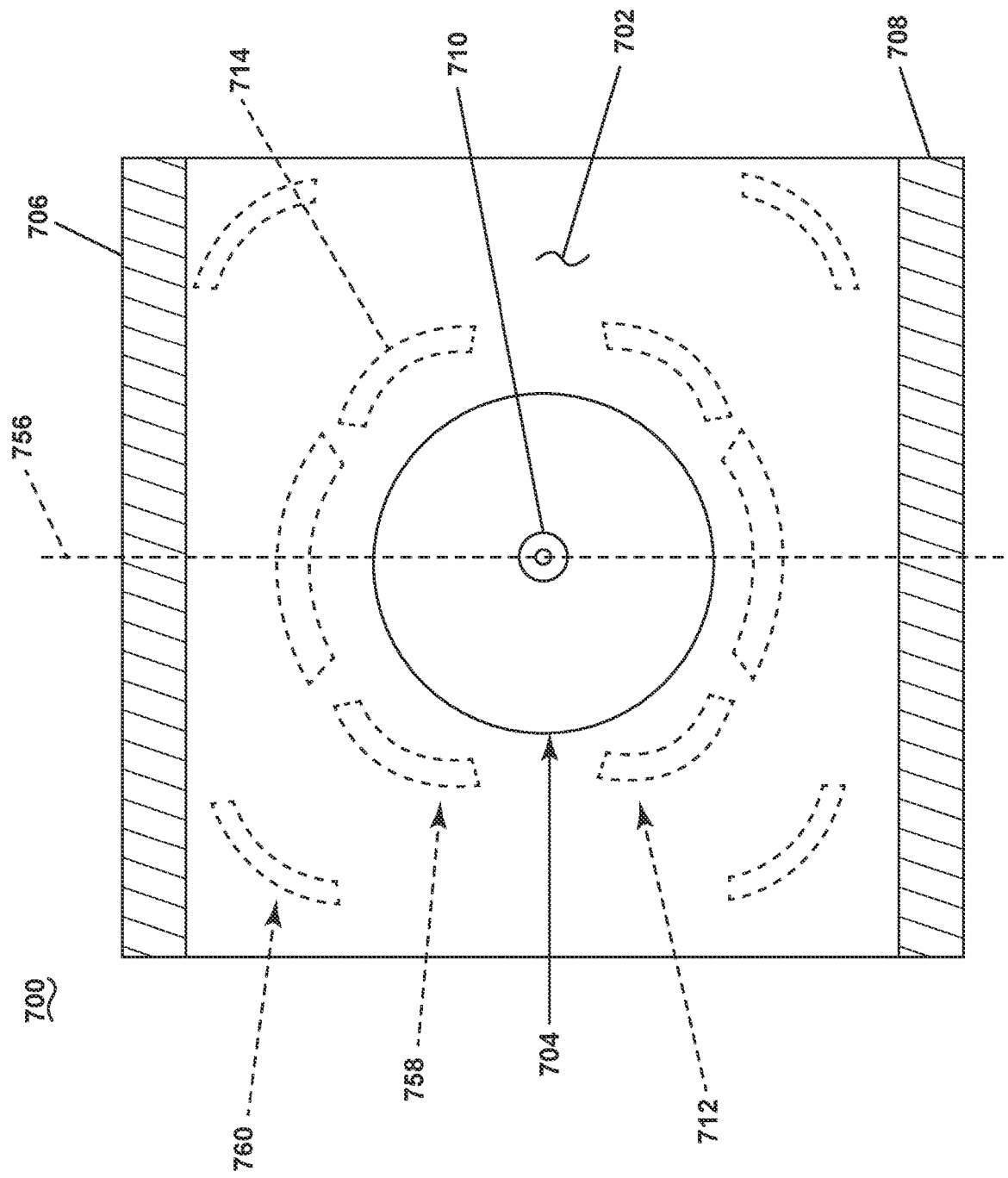
FIG. 13 is a schematic, transverse view of an exemplary dilution passage arrangement suitable for use as the dilution passage arrangement of FIG. 4, further including a fuel cup surrounded by a plurality of non-linear slots.

FIG. 13 is a schematic, transverse view of an exemplary dilution passage arrangement 700 suitable for use as the dilution passage arrangement 200 of FIG. 4. The dilution passage arrangement 700 is similar to the dilution passage arrangement 200, 300 (FIG. 9), 400 (FIG. 10), 500 (FIG. 11), 600 (FIG. 12), therefore, like parts will be identified by like numerals increased to the 700 series, with it being understood that the description of the dilution passage arrangement 200, 300, 400, 500, 600 applies to the dilution passage arrangement 700, unless otherwise noted.

The dilution passage arrangement 700 is provided along a dome wall 702 extending between an outer liner 706 and an inner liner 708. The dilution passage arrangement 700 surrounds a fuel cup 704 defining a fuel cup centerline 710. A plurality of dilution passages 712 terminate at a plurality of slots 714. The plurality of slots 714 extend across at least a portion of the fuel cup centerline 710.

The plurality of slots 714 are shown in phantom lines. As such, the plurality of slots 714 of the dilution passage arrangement 700 can be any suitable shape, size, or form. The illustrated phantom lines of the plurality of slots 714 show an instance where the plurality of slots 714 are formed non-linearly. As a non-limiting example, each slot of the plurality of slots 714 can extend about a circumferential extent of the fuel cup centerline 710 and include a curvature defined by a constant radius from the fuel cup centerline 710. The plurality of slots 714 can be symmetric or non-symmetric about a radial plane 756 extending from the fuel cup centerlines 710 and intersecting both the inner liner 708 and the outer liner 706 at right angles.

The dilution passage arrangement 700 is similar to the dilution passage arrangement 300 (FIG. 9), 400 (FIG. 10), in that the plurality of slots 714 include a first row of slots 758 and a second row of slots 760. The difference, however, is that the second row of slots 760 includes a plurality of corner slots. The corner slots of the second row of slots 760, as illustrated, are evenly spaced every 90 degrees about the circumferential extent of the fuel cup centerline 710. The corner slots can be used to help further control flame expansion in-between adjacent fuel cups 704 and towards the outer liner 706 or inner liner 708.

Benefits of the present disclosure include a combustor suitable for use with a hydrogen-containing fuel. As outlined previously, hydrogen-containing fuels have a higher flame temperature than traditional fuels (e.g., fuels not containing hydrogen). That is, hydrogen or a hydrogen mixed fuel typically has a wider flammable range and a faster burning velocity than traditional fuels such petroleum-based fuels, or petroleum and synthetic fuel blends. These high burn temperatures of hydrogen-containing fuel mean that additional insulation is needed between the ignited hydrogen-containing fuel and surrounding components of the gas turbine engine (e.g., the dome wall, the inner/outer liner, and other parts of the gas turbine engine). The combustor, as described herein, includes the plurality of slots that create a layer of insulation (e.g., the curtain of compressed air) between the ignited hydrogen-containing fuel and the dome wall, the inner liner, the outer liner, and any portions of the gas turbine engine outside of the dome wall, the inner liner and the outer liner. The curtain of compressed air is further used to shape the flame within the combustion chamber, which in turn results in an enhanced control of the flame shape profile. By shaping the flame the liner wall temperature, the dome wall temperature, the combustor exit temperature profile and pattern of the flame/gas exiting the combustor can be controlled. This control or shaping can further ensure that the combustion section or otherwise hot sections of the turbine engine do not fail or otherwise become ineffective by being overly heated, thus increasing the lifespan of the turbine engine. Further, the introduction of the dilution passage arrangements, as described herein, ensure an even, uniform, or otherwise desired flame propagation within the combustor.

Benefits associated with using hydrogen-containing fuel over conventional fuels include an eco-friendlier engine as the hydrogen-containing fuel, when combusted, generates less carbon pollutants than a combustor using conventional fuels. For example, a combustor including 100% hydrogen-containing fuel (e.g., the fuel is 100% $H_2$) would have zero carbon pollutants. The combustor, as described herein, can be used in instances where 100% hydrogen-containing fuel is used.

Further benefits associated with using hydrogen-containing fuel over conventional fuels include a gas turbine engine that can utilize less fuel due to higher heating vale of fuel to achieve same turbine inlet temperatures. For example, a conventional gas turbine engine using conventional fuels will require less fuel to produce the same amount of work or engine output as the present gas turbine engine using hydrogen-containing fuels and having a more lean flame. This, in turn, means that either less amount of fuel can be used to generate the same amount of engine output as a conventional gas turbine engine, or the same amount of fuel can be used to generate an excess of increased engine output when compared to the conventional gas turbine engine.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A combustor for a gas turbine engine, the combustor comprising an annular liner, a dome wall coupled to the annular liner, a combustion chamber at least partially defined by the annular liner and the dome wall, at least one fuel cup provided on the dome wall and fluidly coupled to the combustion chamber, the fuel cup defining a fuel cup centerline, and at least one dilution passage defining a dilution passage centerline and terminating in at least one slot opening onto the dome wall, with the at least one slot defining a longitudinal body axis, wherein the slot is arranged relative to the fuel cup centerline to form a slot angle between the longitudinal body axis and a radial line extending from the fuel cup centerline and intersecting the longitudinal body axis, with the at least one slot angle having an absolute value greater than 0 degrees and less than 90 degrees.

A combustor for a gas turbine engine, the combustor comprising an annular liner having an inner liner and an outer liner, a circumferential dome wall extending between the inner liner and the outer liner, a combustion chamber at least partially defined by the annular liner and the dome wall, a plurality of fuel cups circumferentially spaced around the circumferential dome wall and fluidly coupled to the combustion chamber, each of the plurality of fuel cups defining a fuel cup centerline, and a set of slots circumferentially spaced about each of the plurality of fuel cups, wherein the set of elongated slots are continuously spaced circumferentially about the corresponding fuel cup centerline, except at least a first break and a second break on opposite sides of each of the plurality of fuel cups.

The combustor of any preceding clause, wherein the at least one dilution passage comprises a plurality of dilution passages with each terminating in at least one slot to define a plurality of slots, with each of the plurality of slots defining its own slot angle, which collectively form a set of slot angles.

The combustor of any preceding clause, wherein at least some of the slot angles in the set of slot angles are the same.

The combustor of any preceding clause, wherein all of the slot angles in the set of slot angles are the same.

The combustor of any preceding clause, wherein the plurality of slots are circumferentially spaced about the fuel cup centerline.

The combustor of any preceding clause, wherein at least some of the plurality of slots are arranged to form at least a first row and second row.

The combustor of any preceding clause, wherein the first row and the second row are spaced different radial amounts from the fuel cup centerline.

The combustor of any preceding clause, wherein the plurality of slots are continuously spaced circumferentially about the fuel cup centerline, except for at least one break.

The combustor of any preceding clause, wherein the at least one break extends over an arc segment defining a break angle as measured from the fuel cup centerline.

The combustor of any preceding clause, wherein the break angle is greater than or equal to 5 degrees and less than or equal to 120 degrees.

The combustor of any preceding clause, wherein the at least one break comprises two breaks.

The combustor of any preceding clause, wherein the two breaks are on circumferentially opposite sides of the at least one fuel cup.

The combustor of any preceding clause, wherein the at least one fuel cup further comprises a flared surface, which defines a flare line emanating from the fuel cup centerline and lying in the flared surface, wherein the flare line forms a passage angle with the dilution passage centerline.

The combustor of any preceding clause, wherein the passage angle is greater than or equal to 0 degrees and less than or equal to 120 degrees.

The combustor of any preceding clause, wherein the at least one fuel cup receives a flow of fuel including a hydrogen fuel.

The combustor of any preceding clause, wherein a volume of compressed air flows through the slot over a period of time to define a total slot flow and a volume of fuel/air mixture flows through the at least one fuel cup over the period of time to define a total fuel cup flow, with a ratio between the total slot flow and the total fuel cup flow being greater than or equal to 0.5 and less than or equal to 8.

The combustor of any preceding clause, wherein at least some of the plurality of fuel cups are circumferentially arranged such that the fuel cup centerlines define a circumferential line and the first break and the second break of the at least some of the plurality of fuel cups overly the circumferential line.

The combustor of any preceding clause, wherein the first break and the second break each extend over an arc segment defining a respective first break angle and a second break angle as measured from the fuel cup centerline, with an absolute value of the first break angle and the second break angle being greater than or equal to 5 degrees and less than or equal to 120 degrees.

The combustor of any preceding clause, wherein each slot of the set of slots defines a termination at least one dilution passage defining a dilution passage centerline when viewed along a radial plane extending from the fuel cup centerline and intersecting the slot, the plurality fuel cups further comprise a flared surface, which defines a flare line emanating from the fuel cup centerline and lying in the flared surface, a passage angle is formed between the dilution passage centerline and the flare line, with the passage angle being greater than or equal to 0 degrees and less than or equal to 120 degrees.

The combustor of any preceding clause, wherein the at least one slot includes a first slot, a second slot, and a third slot, with each including a respective longitudinal body axis.

The combustor of any preceding clause, wherein the longitudinal body axis of the first slot is parallel to or perpendicular to a radial line extending from the fuel cup centerline and intersecting the longitudinal body axis of the first slot, and the longitudinal body axis of at least one of the second slot or the second slot extends at the slot angle.

The combustor of any preceding clause, wherein the longitudinal body axis of the second slot and the second slot each extend at a respective slot angle that is opposite in magnitude.

The combustor of any preceding clause, wherein the second slot is on a circumferentially opposite side of the first slot from the third slot, with respect to the fuel cup centerline.

The combustor of any preceding clause, the longitudinal body axis of the first slot, the second slot and the third slot area each parallel to or perpendicular to a radial line extending from the fuel cup centerline and intersecting a respective longitudinal body axis of the first slot, the second slot, and the third slot, respectively.

The combustor of any preceding clause, wherein the second row includes four slots that are evenly spaced in increments of 90 degrees about the circumferential extent of the fuel cup centerline.

What is claimed is:

1. A combustor for a gas turbine engine, the combustor comprising:
    an annular liner;
    a dome wall coupled to the annular liner;
    a combustion chamber at least partially defined by the annular liner and the dome wall;
    at least one fuel cup provided on the dome wall and fluidly coupled to the combustion chamber, the fuel cup defining a fuel cup centerline, the at least one fuel cup having a flared surface, which defines a flare line emanating from the fuel cup centerline and lying in the flared surface; and
    at least one dilution passage defining a dilution passage centerline and terminating in at least one slot opening onto the dome wall, with the at least one slot defining a longitudinal body axis, with the flare line forming a passage angle with the dilution passage centerline;
    wherein the slot is arranged relative to the fuel cup centerline to form a slot angle between the longitudinal body axis, and a radial line extending from the fuel cup centerline and intersecting the longitudinal body axis, with the slot angle having an absolute value greater than 0 degrees and less than 90 degrees.

2. The combustor of claim 1, wherein the passage angle is greater than or equal to 0 degrees and less than or equal to 120 degrees.

3. A combustor for a gas turbine engine, the combustor comprising:
an annular liner having an inner liner and an outer liner;
a circumferential dome wall extending between the inner liner and the outer liner;
a combustion chamber at least partially defined by the annular liner and the dome wall;
a plurality of fuel cups circumferentially spaced around the circumferential dome wall and fluidly coupled to the combustion chamber, each of the plurality of fuel cups defining a fuel cup centerline, with each fuel cup of the plurality of fuel cups having a flared surface, which defines a flare line emanating from the fuel cap centerline and lying in the flared surface; and
a set of slots circumferentially spaced about each of the plurality of fuel cups, with each slot of the set of slots:
defining a termination of a respective dilution passage, each respective dilution passage having a dilution passage centerline when viewed along a radial plane extending from the fuel cup centerline and intersecting the slot; and
a passage angle is formed between the dilution passage centerline of the respective dilution passage and the flare line, with the passage angle being greater than or equal to 0 degrees and less than or equal to 120 degrees;
wherein the set of slots are continuously spaced circumferentially about the corresponding fuel cup centerline, except at least a first break and a second break on opposite sides of each of the plurality of fuel cups.

4. The combustor of claim 3, wherein at least some of the plurality of fuel cups are circumferentially arranged such that the fuel cup centerlines define a circumferential line and the first break and the second break of the at least some of the plurality of fuel cups overlie the circumferential line.

5. The combustor of claim 4, wherein the first break and the second break each extend over an arc segment defining a respective first break angle and a second break angle as measured from the fuel cup centerline, with an absolute value of each of the first break angle and the second break angle being greater than or equal to 5 degrees and less than or equal to 120 degrees.

6. A combustor for a gas turbine engine, the combustor comprising:
an annular liner;
a dome wall coupled to the annular liner;
a combustion chamber at least partially defined by the annular liner and the dome wall;
at least one fuel cup provided on the dome wall and fluidly coupled to the combustion chamber, the fuel cup defining a fuel cup centerline; and
a plurality of dilution passages extending through the dome wall and terminating in a plurality of slots opening onto the dome wall, with each dilution passage of the plurality of dilution passages including a dilution passage centerline, and with each slot of the plurality of slots having a respective longitudinal body axis, with the plurality of slots:
having a radially innermost row of slots having a radially innermost break by an arcuate segment emitting from the fuel cup centerline and terminating at a pair of circumferentially opposing slots of the radially innermost row of slots, the radially innermost break defined by an absence of regularly spaced slots of the radially innermost row of slots within the arcuate segment including a break angle having an absolute value that is greater than or equal to 5 degrees and less than or equal to 120 degrees; and
being arranged such that each slot of the plurality of slots extends at a slot angle relative to the respective longitudinal body axis and a radial line extending from the fuel cup centerline and intersecting the respective longitudinal body axis, with the slot angle having an absolute value greater than 0 degrees and less than 90 degrees.

7. The combustor of claim 6, wherein at least some of the slot angles of the plurality of slots are the same.

8. The combustor of claim 7, wherein all of the slot angles of the plurality of slots are the same.

9. The combustor of claim 6, wherein the plurality of slots are circumferentially spaced about the fuel cup centerline.

10. The combustor of claim 9, wherein at least some of the plurality of slots are arranged to form at least the radially innermost row of slots and a second row of slots spaced radially outward from the radially innermost row of slots.

11. The combustor of claim 10, wherein the plurality of slots further comprise a second break, provided radially outward from the radially innermost break, the radially innermost break extending between circumferentially opposing slots provided on the radially innermost row of slots and the second break extending between circumferentially opposing slots provided on the second row, with the radially innermost break and the second break being defined by respective arcuate segments including respective break angles.

12. The combustor of claim 11, wherein the break angle of the second break is larger than the break angle of the radially innermost break.

13. The combustor of claim 11, wherein the arcuate segment of the second break extends over an entirety of the arcuate segment of the radially innermost break.

14. The combustor of claim 10, wherein at least a portion of the slots of the plurality of slots provided on the radially innermost row have an opposing slot angle with respect to at least a portion of the slots of the plurality of slots provided on the second row.

15. The combustor of claim 10, wherein:
at least a portion of the slots of the plurality of slots provided on the radially innermost row have a respective longitudinal body axis extending in a first circumferential direction from a radially innermost portion of the respective longitudinal body axis to a radially outermost portion of the respective longitudinal body axis; and
at least a portion of the slots of the plurality of slots provided on the second row have a respective longitudinal body axis extending in a second circumferential direction from a radially innermost portion of the respective longitudinal body axis to a radially outermost portion of the respective longitudinal body axis, the second circumferential direction being opposite the first circumferential direction.

16. The combustor of claim 6, wherein the radially innermost break comprises two breaks.

17. The combustor of claim 16, wherein the two breaks are on circumferentially opposite sides of the at least one fuel cup.

18. The combustor of claim 6, wherein the at least one fuel cup receives a flow of fuel including a hydrogen fuel.

19. The combustor of claim 6, wherein a volume of compressed air flows through the slot over a period of time to define a total slot flow and a volume of fuel/air mixture flows through the at least one fuel cup over the period of time to define a total fuel cup flow, with a ratio between the total slot flow and the total fuel cup flow being greater than or equal to 0.5 and less than or equal to 8.

20. The combustor of claim 6, wherein the plurality of slots include an oblong cross-sectional area when viewed along a plane extending radially from and being perpendicular with the fuel cup centerline.

* * * * *